(12) United States Patent
Retherford

(10) Patent No.: US 8,317,460 B1
(45) Date of Patent: Nov. 27, 2012

(54) BOUNDARY LAYER WIND TURBINE

(75) Inventor: Randy D. Retherford, Olathe, KS (US)

(73) Assignee: Randy D. Retherford, Olathe, KS (US)

( * ) Notice: Subject to any disclaimer, the term of this patent is extended or adjusted under 35 U.S.C. 154(b) by 795 days.

(21) Appl. No.: 12/488,014

(22) Filed: Jun. 19, 2009

(51) Int. Cl.
*F03B 3/12* (2006.01)

(52) U.S. Cl. ......... 415/90; 415/4.2; 415/4.4; 416/146 R; 416/23; 416/198 R; 416/244 R

(58) Field of Classification Search ............... 415/90, 415/4.2, 4.4; 416/142, 143, 146 R, 169 R, 416/23, 198 R, 9, 244 R; 290/44, 55
See application file for complete search history.

(56) References Cited

U.S. PATENT DOCUMENTS

| | | | |
|---|---|---|---|
| 5,297,926 A * | 3/1994 | Negishi | 415/90 |
| 6,224,325 B1 * | 5/2001 | Conrad et al. | 415/90 |
| 7,695,242 B2 * | 4/2010 | Fuller | 415/2.1 |
| 2007/0296219 A1 | 12/2007 | Nica | |
| 2009/0200808 A1 * | 8/2009 | Parmley, Sr. | 290/55 |

* cited by examiner

*Primary Examiner* — Ninh H Nguyen
(74) *Attorney, Agent, or Firm* — Hovey Williams LLP

(57) ABSTRACT

A boundary layer wind turbine having one or more flaps coupled to the underneath of a turbine disk is provided. The turbine uses an assembly of closely stacked disks that are rotated by the wind blowing across the face of the disks to rotate a turbine shaft that is attached to an electrical generator to generate electricity. The wind moves the turbines as it flows across the surface of the closely spaced disks. The disks include one or more flaps attached to the bottom side of the disks. The wind blows against the flap, which in turn exerts a force on the disk, causing the turbine to rotate. The flaps may be located near the outer circumference of the disks. The one or more flaps on the disks retract automatically as the rotational velocity of the turbine increases.

19 Claims, 5 Drawing Sheets

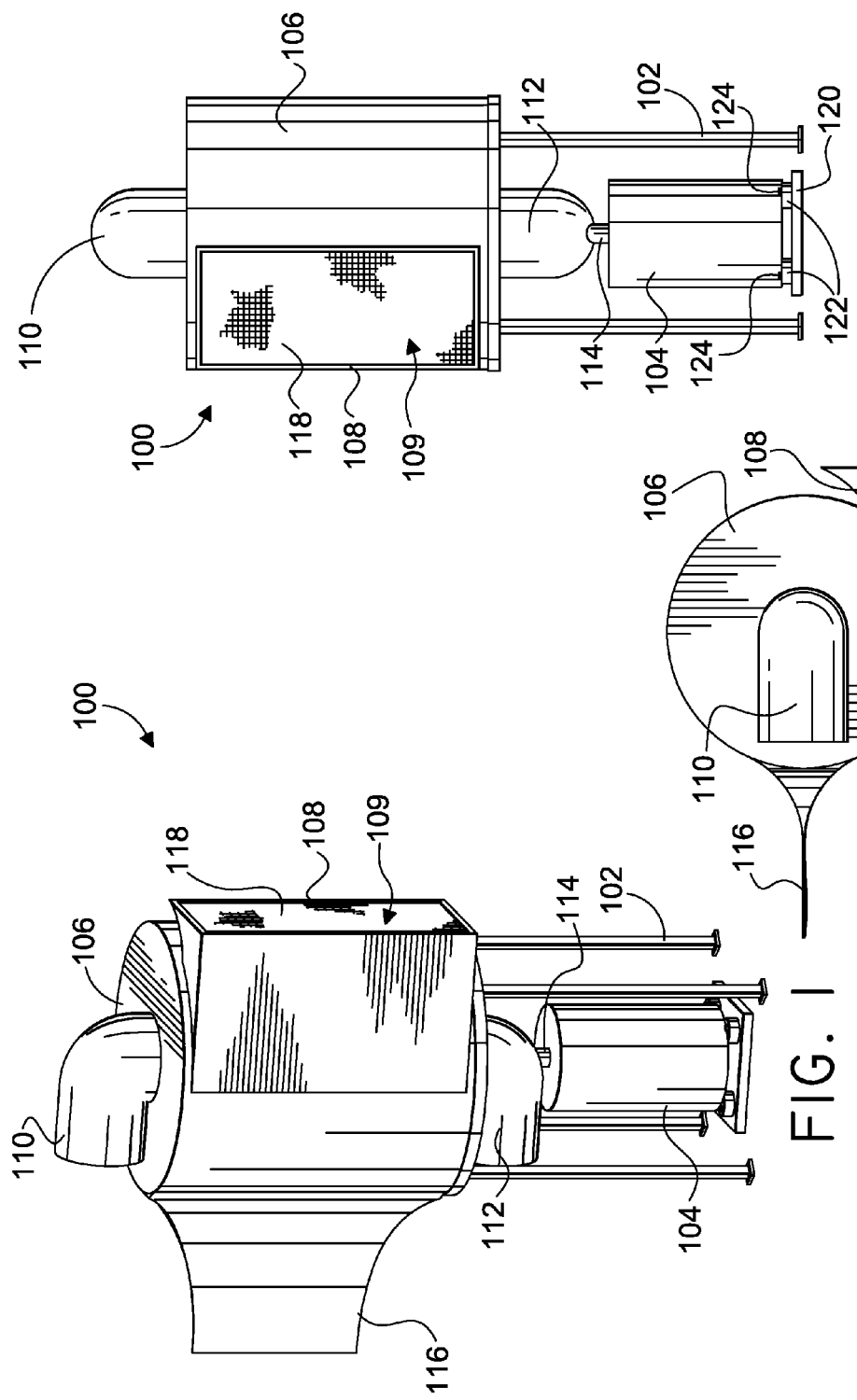

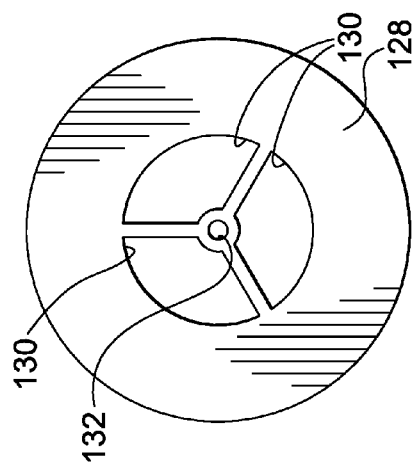
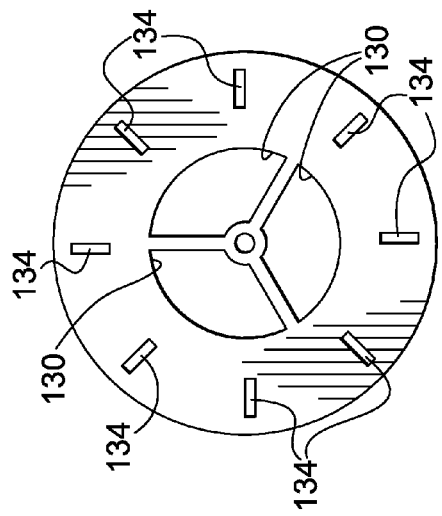
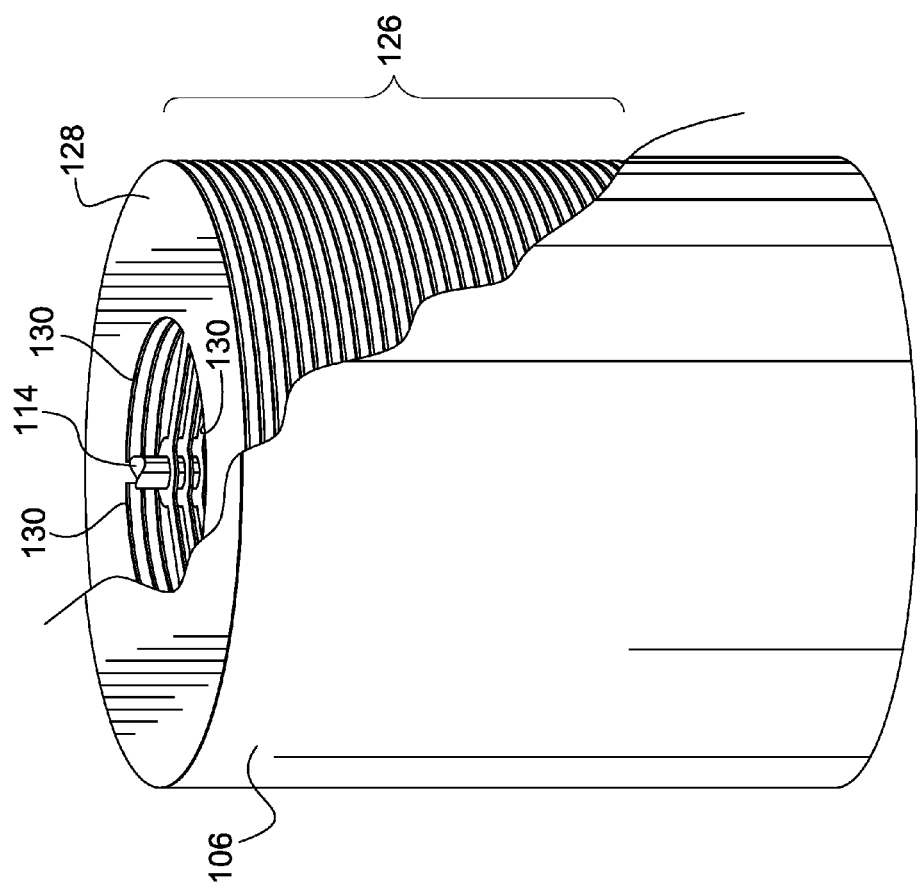

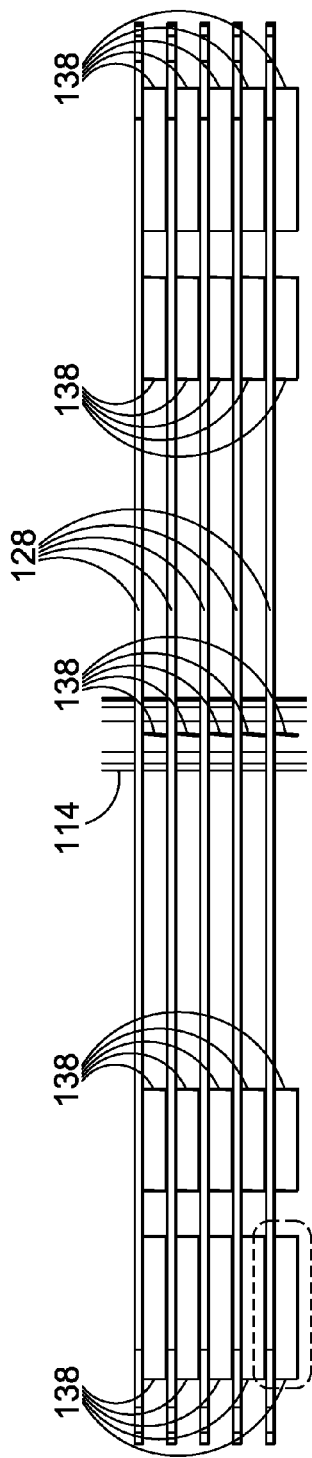
FIG. 7
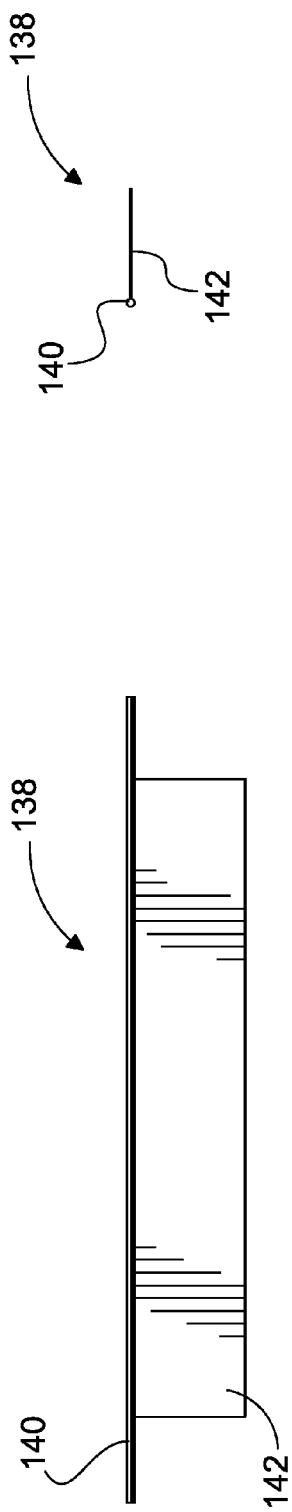
FIG. 8
FIG. 9

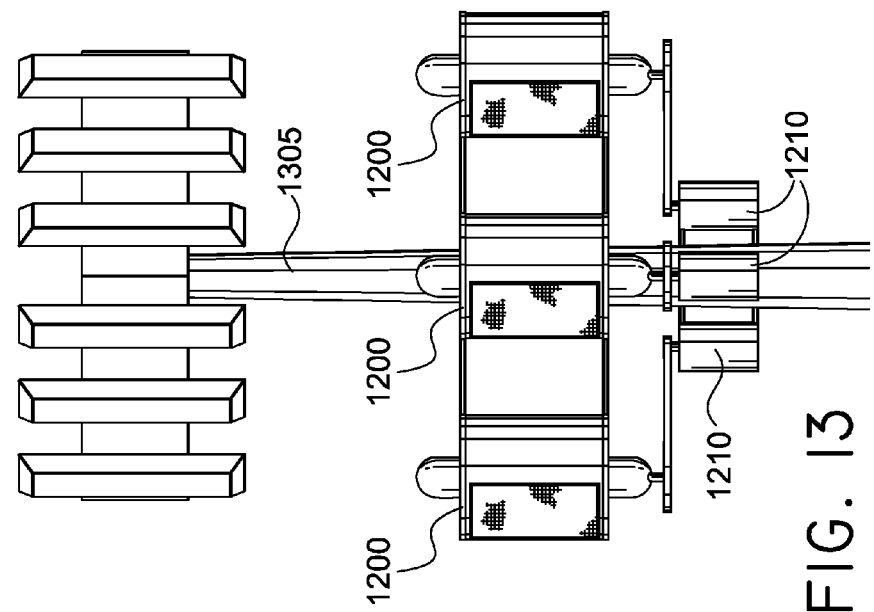
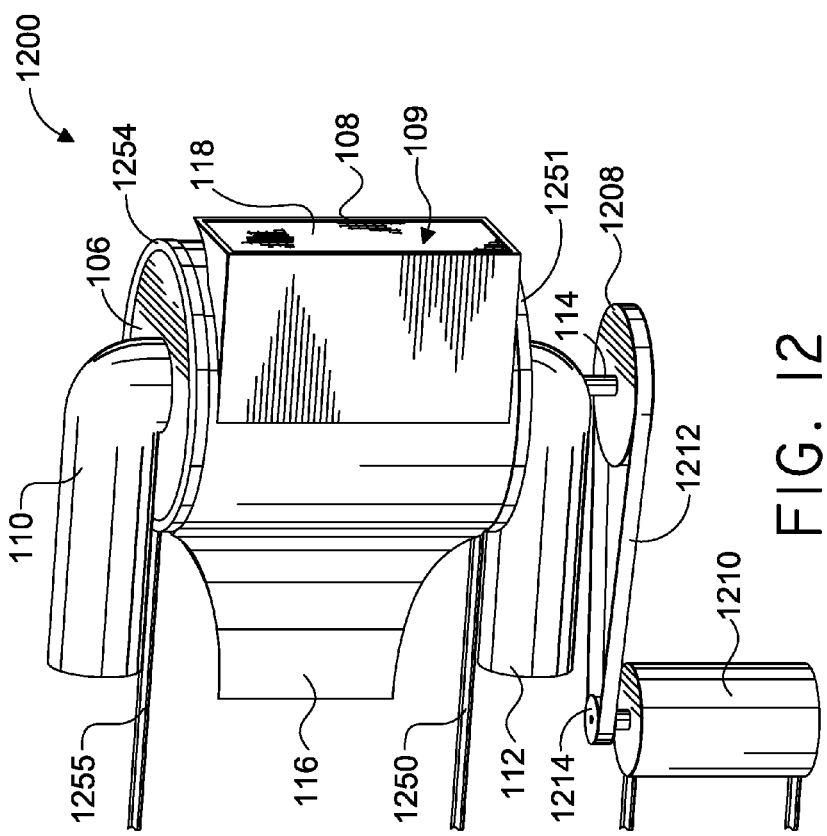

BOUNDARY LAYER WIND TURBINE

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, a turbine disk for use in a boundary layer wind turbine including a disk-shaped body ("body") that includes one or more air vents near a center of the body, the air vents enabling wind to pass though said body by way of said vents. The turbine disk also includes a hinged flap coupled to a bottom side of the body, wherein the hinged flap is moveable between about zero and ninety degrees measured with respect to said bottom.

In another illustrative embodiment, a boundary layer wind turbine including a turbine assembly that includes a turbine shaft and a plurality of turbine disks that are coupled to the turbine shaft. The plurality of turbine disks are approximately perpendicular to a center axis of the turbine shaft. The turbine assembly also includes a hinged flap that is coupled to a bottom side of one of the plurality of turbine disks. The hinged flap is moveable between about zero and ninety degrees measured with respect to said bottom side.

In a further illustrative embodiment, a boundary layer wind turbine includes a turbine assembly that includes a turbine shaft and a plurality of turbine disks that are coupled to the turbine shaft. The plurality of turbine disks are perpendicular to a center axis of the turbine shaft and have one or more vents near a center of each of the plurality of turbine disks. The turbine also includes a turbine housing that defines a void in which the turbine assembly is housed. The turbine also includes a base that is coupled to the turbine housing through an assembly that allows the turbine housing to rotate relative to the base and relative to the turbine assembly.

BRIEF DESCRIPTION OF THE SEVERAL VIEWS OF THE DRAWINGS

Illustrative embodiments of the present invention are described in detail below with reference to the included drawing figures, wherein:

FIG. 1 is a diagram showing a perspective view of a wind turbine, in accordance with an embodiment of the present invention;

FIG. 2 is a diagram showing a side view of the wind turbine, in accordance with an embodiment of the present invention;

FIG. 3 is a diagram showing a top view of the wind turbine, in accordance with an embodiment of the present invention;

FIG. 4 is a diagram showing a partial cross-section of the housing and the turbine assembly within the housing, in accordance with an embodiment of the present invention;

FIG. 5 is a diagram showing a top view of a boundary layer turbine disk, in accordance with an embodiment of the present invention;

FIG. 6 is a diagram showing a bottom view of a boundary layer turbine disk, in accordance with an embodiment of the present invention;

FIG. 7 is a diagram showing a side view of the turbine assembly, in accordance with an embodiment of the present invention;

FIG. 8 is a diagram showing a detailed view of a flap, in accordance with an embodiment of the present invention;

FIG. 9 is a diagram showing a side view of the flap, in accordance with an embodiment of the present invention;

FIG. 12 is a drawing showing a perspective view of a wind turbine having cantilevered support arms, in accordance with an embodiment of the present invention; and FIG. 13 is a drawing showing a side view of three wind turbines attached to a cell phone tower, in accordance with an embodiment of the present invention.

DETAILED DESCRIPTION

Figure 10:
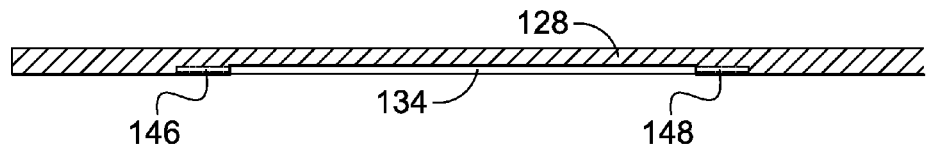
FIG. 10 is a diagram showing a section view of the flap compartment in a turbine disk is shown, in accordance with an embodiment of the present invention.

Embodiments of the present invention are generally directed at a boundary layer wind turbine. A boundary layer turbine may also be described as a Tesla turbine after Nikola Tesla who did pioneering work on boundary layer turbines. The turbine uses an assembly of closely stacked disks that are rotated by the wind blowing across the face of the disks to rotate a turbine shaft that is attached to an electrical generator to generate electricity. The wind moves the turbines as it flows across the surface of the closely spaced disks. In the embodiments of the present invention, the disks include one or more flaps attached to the bottom side of the disks. The wind blows against the flap, which in turn exerts a force on the disk, causing the turbine to rotate. The flaps may be located near the outer circumference of the disks. The one or more flaps on the disks retract automatically as the rotational velocity of the turbine increases. Thus, embodiments of the present invention utilize both wind pressure and a boundary layer effect to drive the turbine.

Turning now to FIG. 1, a perspective view of a wind turbine 100 is shown, in accordance with an embodiment of the present invention. The wind turbine 100 includes a base 102 upon which the wind turbine rests. The base 102 may be connected to a foundation through one or more bolts attached to the feet of the base legs. The base 102 may be made of fiberglass, aluminum, or any other material suitable for exterior exposure. If appropriate, a coating system may be applied to the base to help it withstand the elements.

The wind turbine 100 includes an electrical generator 104 that is connected to the turbine assembly (not shown) through the turbine shaft 114. A direct drive assembly may be used to rotate components within the electrical generator 104. In another embodiment, a series of belts, pulleys, and/or gears may be used to indirectly drive the electrical generator 104. In one embodiment, the electrical generator uses electromagnetic induction to generate electricity.

The wind turbine 100 includes a turbine housing 106 that houses the turbine assembly. Air enters the turbine housing 106 through the air inlet nozzle 108. The air inlet nozzle and turbine housing 106 may form a volute whose cross-sectional area decreases as it approaches the interior of the turbine housing 106. The air inlet nozzle 108 includes an opening 109 for the wind to enter and a discharge (not shown) into the turbine housing 106. In one embodiment, the air inlet nozzle 108 is covered by a course screen 118. The turbine housing 106 also includes an upper vent 110 and a lower vent 112 for the air to exit after the wind has flowed through the turbine assembly (shown in FIG. 4). As explained subsequently, the air is drawn into the turbine assembly, exerting a rotational force on the disks as it flows across the surface of the disks. The air then flows through holes near the center of the disks and exits the turbine assembly at either the top or the bottom, or at both the top and the bottom, of the turbine housing 106 as is shown in FIG. 1. The turbine housing 106 also includes a fin 116. The fin 116 causes the turbine housing 106 to rotate relative to the base 102 depending on which way the wind is blowing. Thus, the turbine housing 106 can rotate like a wind vane so that the opening 109 of the air inlet nozzle 108 is facing the wind. Adjusting the orientation of the turbine housing 106 to face the wind maximizes the air flow into the turbine housing 106 and, thus, into the turbine assembly. The turbine housing 106 may be constructed of any material suitable for exterior exposure. Ideally, lightweight materials such as aluminum or fiberglass may be desirable to facilitate the rotation of the turbine housing 106 into the wind.

Turning now to FIG. 2, a side view of the wind turbine 100 is shown, in accordance with an embodiment of the present invention. The side view shows the opening 109 to the air inlet nozzle 108. The turbine housing 106 is shown sitting on the base 102. In this view, the electrical generator 104 is attached to a support foundation 120 using bolts 124 that pass through the feet 122 of the electrical generator 104. The upper vent 110 and the lower vent 112 exhaust air on either side of the turbine housing 106. Though shown with a turbine housing 106, embodiments of the present invention do not require the turbine assembly to be covered with a turbine housing 106. In one embodiment, the wind turbine 100 includes a turbine assembly connected to an electrical generator 104 without a turbine housing. A turbine housing may be desirable to help protect the closely spaced disks in the turbine assembly from collecting debris. In one embodiment, a screen 118 covers the opening 109 to the air inlet nozzle 108 to help keep the turbine assembly clean.

Turning now to FIG. 3, a top view of the wind turbine 100 is shown, in accordance with an embodiment of the present invention. As can be seen, the turbine housing 106 is generally cylindrical in shape. The top view also illustrates that the fin 116 is roughly perpendicular to the opening 109 on the air inlet nozzle 108. The fin 116 and the air inlet nozzle 108 are approximately on opposite sides of the turbine housing 106. The upper vent 110 exhausts in the opposite direction of the wind to avoid adding back pressure to the air discharge.

Turning now to FIG. 4, a partial cross-section of the turbine housing 106 and the turbine assembly 126 within the turbine housing 106 is shown, in accordance with an embodiment of the present invention. The turbine assembly 126 includes a plurality of closely stacked disks that are similar to disk 128 which is shown on top of the stack. Disk 128 includes three air vents 130 and attach to the turbine shaft 114. In operation, air enters the turbine assembly 126 at the outer circumference of the disks, moves inward and rotates the disks through a boundary effect, before exiting through the vents 130 toward the center of the disk 128.

Turning now to FIG. 5, a top view of the disk 128 is shown, in accordance with an embodiment of the present invention. The top view shows three vents 130. The vents 130 are shown roughly as rectangular, but may be any shape suitable for venting the air. In addition, more or less than three vents 130 may be included on the disk 128. The disk 128 may be as small as a few centimeters in diameter or as large as several meters. In one embodiment, the disks are between 24 and 48 inches in diameter. The disk 128 should be lightweight and stiff enough to resist deformation as the turbine rotates. The disk 128 attaches to the turbine shaft 114 through shaft opening 132.

Turning now to FIG. 6, the bottom side of the disk 128 is shown, in accordance with an embodiment of the present invention. In addition to the vents 130 and shaft opening 132 explained previously with reference to FIG. 5, the bottom side shows eight flap compartments 134. The flap compartments 134 are sized and shaped to receive a flap that hangs down from the bottom of the disk 128. The actual flaps are not shown attached to the disk 128 in FIG. 6. Embodiments of the present invention are not limited to disks having eight flaps. More or less flaps may be used as appropriate. The flaps may be located near the exterior of the disk 128.

Turning now to FIG. 7, a side view of the turbine assembly 126 is shown, in accordance with an embodiment of the present invention. The side view of the turbine assembly 126 shows the turbine shaft 114, which is located in the center of the turbine assembly 126. The turbine assembly 126 includes five disks 128. Only five disks are shown for the sake of simplicity, in actuality, the turbine assembly 126 may include many more disks. Five sets of hinged flaps 138 (alternatively referred to a flap) that hang down from the bottom of a disk and rest on the top surface of the disk below can be seen from the perspective shown in FIG. 7. In one embodiment, the hinged flaps 138 rest at an angle that is less than perpendicular to the disk. Resting the flap on the disk below allows the rotation of the flap 138 on a hinge to be restrained and transfers the force from the wind pressure exerted on the body of the flap 138 to both the disk above and below the hinged flap 138. In FIG. 7, all of the flaps are shown in the down position. As the turbine assembly 126 begins to rotate rapidly, the flaps will rotate into a close position where they are nearly parallel to the disk to which they are attached.

In one embodiment, one or more spacers (not shown) are installed between the disks to maintain even spacing between the disks. Spacers may also provide additional stiffness to the disks. Spacers may be installed near the edge of the turbine assembly. In one embodiment, several strips attach to the edge of the disks around the exterior of the turbine assembly. The strips run parallel to the turbine shaft and help maintain spacing between the disks and provide structural support.

Turning now to FIG. 8, a detailed view of a hinged flap 138 is shown, in accordance with an embodiment of the present invention. The flap 138 includes a flap body 142 and a pin 140 that is located along a long edge of the flap body 142. As can be seen, the flap body 142 is approximately a rectangle. In one embodiment, the pin 140 may be replaced by a single pin at either end of the flap body 142 rather than running all the way along the edge of the flap body 142. FIG. 9 illustrates a side view of the flap 138. As can be seen, the flap body 142 is thin. The flap 138 may be constructed of any material suitable for exposure to the elements, but should generally be a lightweight material that maintains its rigidity.

Turning now to FIG. 10, a section view of the flap compartment 134 in a turbine disk 128 is shown, in accordance with an embodiment of the present invention. The body of the disk 128 defines the flap compartment 134 which may be approximately the size of the flap. Sockets 146 and 148 are located at either end of the flap compartment 134 to support and receive the pins on either end of the flap 138. Socket 146 may contain a curved ramp 147 that couples with a curved groove 144 on one end of the pin 140. The pin 140 moves towards the center of the disk 128 as the pin rotates down the curved ramp 147 into the down position. The pin 140 rotates a little less than 90 degrees and moves towards the circumference of the disk as the curved groove 144 couples with the curved ramp 147 and moves into the up position. Socket 148 may be deep enough to allow the pin 140 to move into the socket toward the center of the disk 128 as the pin 140 rotates down the curved ramp 147 into the down position. However, the depth of the socket 148 should constrain the lateral movement of the pin 140 so that end of the pin 140 does not fall out of socket 146 when the flap 138 is in the down position.

Figure 11A:
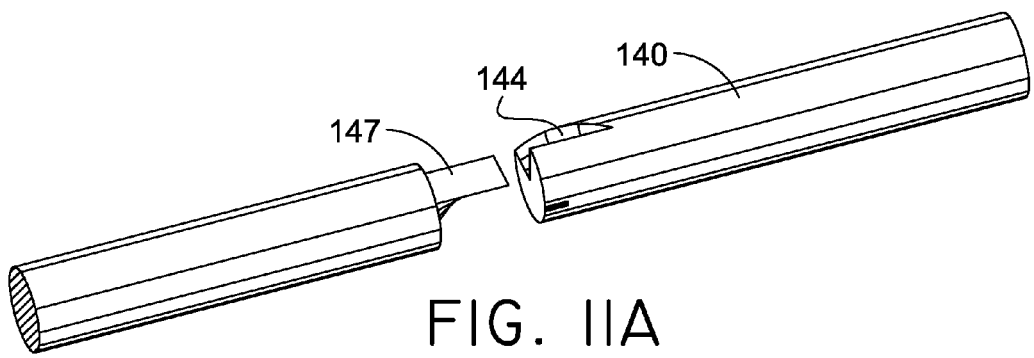
FIGS. 11A-C are diagrams showing the rotation of the pin as the curved groove on the pin couples with the curved ramp inside the socket, in accordance with an embodiment of the present invention.
Figure 11B:
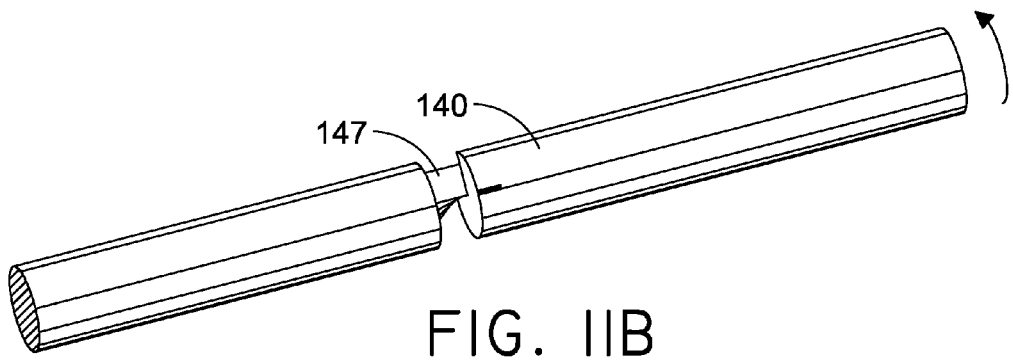
Figure 11C:
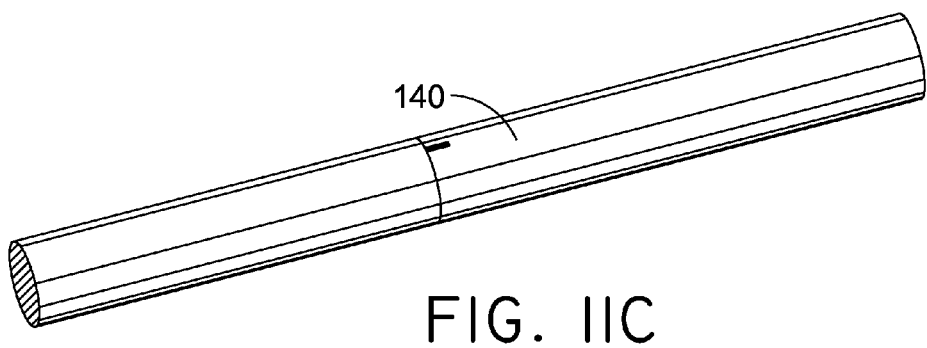

Turning now to FIGS. 11A-C, the rotation of the pin 140 as the curved groove 144 on the pin couples with the curved ramp 147 inside the socket is shown, in accordance with an embodiment of the present invention. For the sake of clarity, the curved ramp 147 is shown without the socket 146. In practice, the curved ramp 147 would be located inside socket 146. As can be seen, a curved groove 144 is present at one end of the pin 140. The curved groove 144 causes the pin 140 to rotate when it pushes against the curved ramp 147 inside the socket 146. This rotation causes the flap 138 to rotate into the flap compartment 134 shown on the bottom of the disk 128 in FIG. 10. The centrifugal force generated as the disk 128 rotates pushes the curved groove 144 on the pin 140 into the curved ramp 147 within the socket 146. Thus, when the disk 128 is rotating quickly, the flap 138 will be in a first position that is roughly parallel to the body of the disk 128. In the first position, the rotation of the disk 128 will be primarily the result of a boundary layer effect on the disk 128. In the second position, the bottom of the flap 138 will rest against the top of the disk below and the flap 138 will be slightly less than perpendicular to the body of the disk 128. In the second position, the rotation of the disk 128 will be partly the result of wind pressure applied to the flap 138 and partly the result of a boundary layer effect of the wind flowing across the surface of the disk 128.

Turning now to FIG. 12, a drawing showing a perspective view of a wind turbine 1200 having cantilevered support arms 1255 is provided, in accordance with an embodiment of the present invention. The wind turbine 1200 is similar to the wind turbine 100 described previously. The wind turbine 100 is designed to be attached to the top surface of a structure or the ground through its legs 102. In contrast, the wind turbine 1200 is designed to be attached to the side of an elevated structure such as a building or cell tower. The housing 106 of the wind turbine 1200 is coupled to a base 1251 and a top support 1254 that allow the housing 106 to rotate relative to the base 1251 and the top support 1254. The housing 106 can also rotate relative to the components inside the housing 106, such as the turbine assembly 126. An upper support arm 1255 is attached to the top support 1254 and a lower support arm 1250 is attached to the base 1251. The ends of the support arms 1255 and 1200 that are not attached to the wind turbine 1200 may be attached to an elevated structure. The turbine shaft 114 is coupled to an electric generator 1200 through a belt 1212 that connects the drive pulley 1208 and the passive pulley 1214. The pulley system is used to transfer rotational motion from the turbine shaft 114 to the electrical generator 1214. Embodiments of the present invention are not limited to using pulleys as shown in FIG. 12. Any mechanism for transferring the rotational motion of the turbine shaft 114 to the electrical generator 1210 may be used.

Turning now to FIG. 13, a drawing showing a side view of three wind turbines 1200 attached to a cell phone tower 1305 is provided, in accordance with an embodiment of the present invention. Each of the wind turbines 1200 are attached to the side of the cell tower 1305 by their support arms. Embodiments of the present invention are not limited to attaching three turbines to a structure such as a cell phone tower. For example, many turbines could be attached to sides of a tall building. The electrical generators 1210 are also attached to the side of the cell tower 1305 through support arms attached to the top and bottom of the electrical generators 1210.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A turbine disk for use in a boundary layer wind turbine comprising:
   a body having a disk shape and including one or more air vents near a center of the body, the air vents enabling wind to pass though said body by way of said vents; and
   a hinged flap coupled to a bottom side of the body, wherein the hinged flap is moveable between about zero and ninety degrees measured with respect to said bottom.

2. The turbine disk of claim 1, wherein the body defines a compartment sized to receive the flap, such that a surface of the flap is almost flush with said bottom side of the body when the flap is rotated about zero degrees from said bottom.

3. The turbine disk of claim 2, wherein the flap includes a flap body with a rectangular shape and a pin across a long edge of the flap body, wherein the pin couples with sockets defined by the body, and wherein the sockets are located on either side of the compartment.

4. The turbine disk of claim 3, wherein the pin has a curved groove on a distal end of the pin that couples with a curved ramp within one of the sockets and causes the pin to rotate as the curved groove slides up the curved ramp as a result of centrifugal forces exerted on the pin as the body rotates.

5. The turbine disk of claim 1, wherein the body is coupled to a turbine shaft through a void defined by the body.

6. The turbine disk of claim 5, wherein the flap rests against a top side of a different turbine disk that is also coupled to the turbine shaft directly below the body when the flap is rotated about 90 degrees from the bottom.

7. The turbine disk of claim 1, wherein the body is between 24 inches and 48 inches in diameter.

8. A boundary layer wind turbine comprising:
   a turbine assembly that includes a turbine shaft and a plurality of turbine disks that are coupled to the turbine shaft, wherein the plurality of turbine disks are approximately perpendicular to a center axis of the turbine shaft; and
   a hinged flap that is coupled to a bottom side of one of the plurality of turbine disks, wherein the hinged flap is moveable between about zero and ninety degrees measured with respect to said bottom side.

9. The boundary layer wind turbine of claim 8, further comprising:
   a turbine housing that defines a void in which the turbine assembly is housed; and
   a base that is coupled to the turbine housing through an assembly that allows the turbine housing to rotate relative to the base and relative to the turbine assembly.

10. The boundary layer wind turbine of claim 9, wherein the turbine housing further includes a tail fin that is coupled to an exterior wall of the turbine housing, and wherein the turbine housing further includes an air inlet nozzle that defines a conduit for wind to enter the turbine housing.

11. The boundary layer wind turbine of claim 10, wherein the tail fin is approximately perpendicular to a plane across an opening of the air inlet nozzle, thereby causing the opening of the air inlet nozzle to be oriented into the wind as the turbine housing rotates relative to the base.

12. The boundary layer wind turbine of claim 8, wherein the plurality of turbine disks include compartments to receive one or more hinged flaps coupled to the bottom of the plurality of turbine disks.

13. The boundary layer wind turbine of claim 8, wherein the hinged flap rests on a top side of a different turbine disk located below the turbine disk to which the hinged flap is attached.

14. A boundary layer wind turbine comprising:
- a turbine assembly that includes a turbine shaft and a plurality of turbine disks that are coupled to the turbine shaft, wherein the plurality of turbine disks are perpendicular to a center axis of the turbine shaft and have one or more vents near a center of each of the plurality of turbine disks;
- a turbine housing that defines a void in which the turbine assembly is housed; and
- a base that is coupled to the turbine housing through an assembly that allows the turbine housing to rotate relative to the base and relative to the turbine assembly, wherein one or more of the plurality of turbine disks include at least one hinged flap that is coupled to a bottom side of the one or more of the plurality of turbine disks, wherein the at least one hinged flap is moveable between about zero and ninety degrees measured with respect to said bottom side.

15. The boundary layer wind turbine of claim 14, wherein the at least one flap includes a flap body with a rectangular shape and a pin across a long edge of the flap body, wherein the pin couples with sockets defined by a body of a turbine disk.

16. The boundary layer wind turbine of claim 15, wherein the pin has a curved groove on a distal end of the pin that couples with a curved ramp within one of the sockets and causes the pin to rotate as the curved groove slides up the curved ramp as a result of centrifugal forces exerted on the pin as the turbine disk rotates.

17. The boundary layer wind turbine of claim 16, wherein the at least one flap rests against a top side of a different turbine disk that is also coupled to the turbine shaft directly below the body when the at least one flap is rotated downward.

18. The boundary layer wind turbine of claim 14, further comprising a top support that couples with the top of the turbine housing through an assembly that allows the turbine housing to rotate relative to the top support and relative to the turbine assembly, wherein the top support and the base include support arms that extend away from the side of the turbine housing, thereby allowing the boundary layer wind turbine to be connected to a side of an elevated structure.

19. The boundary layer wind turbine of claim 14, wherein the elevated structure is a cell phone tower.

* * * * *